3,178,399
FLUORINE-CONTAINING POLYMERS AND
PREPARATION THEREOF
Elizabeth S. Lo, Poughkeepsie, N.Y., assignor to Minnesota Mining and Manufacturing Company, St. Paul, Minn., a corporation of Delaware
Filed Aug. 10, 1961, Ser. No. 130,670
5 Claims. (Cl. 260—87.7)

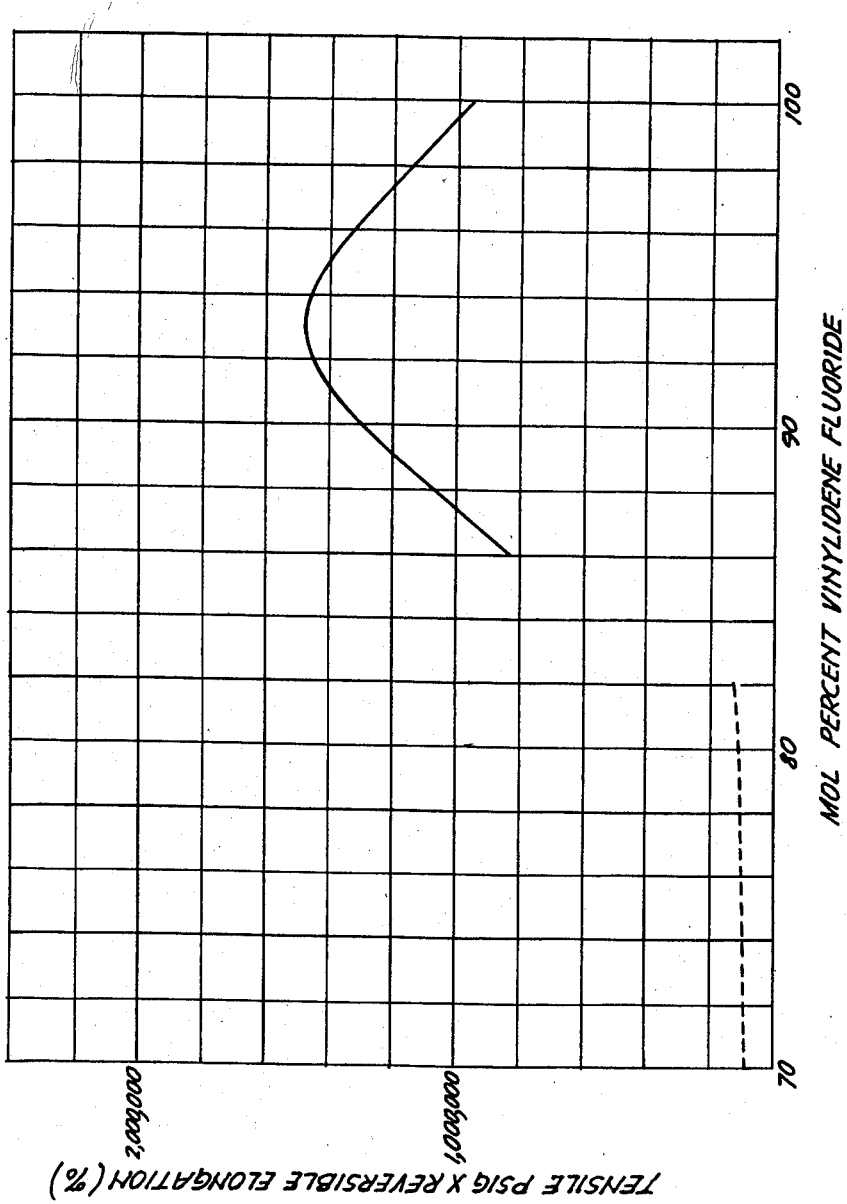

This invention relates to new and useful fluorine-containing polymeric compositions having improved properties and to a method for the preparation thereof. In one aspect, this invention relates to new and valuable high molecular weight fluorine-containing crystalline thermoplastics and partially crystalline polymers having improved properties. In another aspect this invention relates to a process for the production of these new and valuable high molecular weight fluorine-containing polymers.

This application is a continuation-in-part of my prior and copending application, Serial No. 537,886, filed September 30, 1955, now abandoned.

As an accumulative group, fluorine-containing polymeric compositions offer wide utility in various industrial applications due to the desirable properties which they possess such as good physical and chemical stability. One of the most useful polymers in this field is the high molecular weight thermoplastic homopolymer of trifluorochloroethylene which possesses excellent chemical inertness, exhibits flexibility and resilience and is not affected by water, or by humidity, and in general, is an efficient insulating material. At the same time, however, certain of the other properties of the highly fluorinated resinous thermoplastic materials (for example, polytetrafluoroethylene and polytrifluorochloroethylene), such as their insolubility in organic solvents at room temperature, requires that such polymers be used in the form of special dispersions when applying them, for example, as protective coatings, and that even then, a fusion technique is often necessary in order to form a continuous coating or film of the polymer. Further, the techniques presently employed for molding polytrifluorochloroethylene thermoplastic, for example, require the use of high temperatures ranging between about 415° F. and about 625° F., which temperatures are often necessary in order to cause the polymer to flow readily. Such temperatures, however, may also cause undesirable degradation of the polymer.

In addition to the desirability of having a fluorine-containing thermoplastic having improved properties, there also has been a demand for a synthetic resin which possesses a combination of chemical inertness to strong and corrosive chemicals such as fuming nitric acid, inertness to aromatic and aliphatic oils and fuels, and especially inertness to swell by hydraulic ester-type fuels, high tensile strength, retention of reversible elongation properties over a wide range of temperatures—that is, from temperatures of about −30° F. to about 600° F.—solubility in relatively volatile organic solvents and vehicles, and which is easily vulcanized and fabricated into a wide variety of articles.

It is therefore an object of the present invention to provide new and valuable fluorine-containing polymeric materials having improved properties, and to provide a method for the manufacture thereof.

Another object of this invention is to provide new fluorine-containing polymers which can be molded into a variety of useful end products at temperatures which are below that at which degradation or discoloration of the polymer occurs.

Another object is to provide new resinous thermoplastic materials suitable as coatings or films having desirable physical and chemical characteristics, exhibiting the properties of corrosion-resistance to oils, fuels, and various powerful reagents, and at the same time possessing relatively high hardness and flexibility over a wide range of temperatures and which are soluble in various solvents and other vehicles at room temperature.

Another object is to provide a synthetic high molecular weight partially crystalline resin having good reversible elongation, which is easily vulcanized and which retains its flexibility when exposed to low temperatures, and which is resistant to degradation and hardening at temperatures up to 600° F.

Another object is to provide a synthetic high molecular weight and only partially crystalline polymeric material which is resistant to strong and corrosive chemicals such as fuming nitric acid and to aromatic, aliphatic and ester-type fuels and which has good physical and mechanical properties, including high modulus, high tensile strength and reversible elongation.

A further object is to provide a fluorine-containing polymer which is readily applied as a protective coating to surfaces which are to be exposed to strong chemicals or corrosive fuels.

A further object is to provide a high molecular weight partially crystalline fluorine-containing resin having a combination of the above properties and which is readily fabricated into a wide variety of useful end products.

A still further object is to provide a process for the manufacture of fluorine-containing polymers having the above-mentioned desirable characteristics.

Various other objects and advantages of the present invention will become apparent to those skilled in the art from the accompanying description and disclosure.

Accordingly, these objects are accomplished by the novel process which comprises copolymerizing hexafluoropropene and vinylidene fluoride in the presence of a polymerization promoter. Best results are obtained by conducting the polymerization process of the present invention in an aqueous emulsion polymerization system. The presently described process is generally carried out either under autogenous or constant pressure and at a temperature between about 0° C. and about 100° C. The polymers thereby obtained are valuable macromolecules which are adaptable to a number of commercial uses based on the fact that their various properties range from those of rigid resinous thermoplastics to tough, high tensile rubber-like materials possessing varying degrees of flexibility, elasticity and extensibility, and which are readily vulcanized and processed. The copolymers of hexafluoropropene and vinylidene fluoride of the present invention are particularly outstanding and unique with regard to their remarkable high temperature properties and excellent resistance to powerful and corrosive chemicals such as fuming nitric acid and aromatic, aliphatic and ester-type oils, fuels and lubricants in general.

The copolymers of the present invention contain hexafluoropropene (or omega-hydroperfluoropropene) and vinylidene fluoride in varying comonomer ratios from about one to about 15 mol percent, preferably from about one to about 13 mol percent. The particular composition of the polymer product obtained in any particular copolymerization reaction of these two monomers depends to a large extent upon the composition of the monomer mixture initially charged to the reaction zone and the reaction conditions employed to effect copolymerization. In carrying out the polymerization reaction is has been found that the copolymers having above about 15 mol percent of hexafluoropropene are essentially completely amorphous elastomers and are particularly outstanding for their low torsional modulus and retention of their rubbery properties over a wide range of temperatures, i.e. between about −30° F. and about 600° F. without embrittlement, degradation or hardening. Those copolymers containing between about 6 and about 15, preferably between about 6 and about 14, mol percent of combined hexafluoropropene are partially crystalline thermoplastic resins with outstanding high tensile and reversible elongation properties. Those copolymers having between about 1 and about 3 mol percent of hexafluoropropene are normally resinous thermoplastic materials at room temperature and also retain their flexibility over a wide range of temperature without embrittlement. Those copolymers containing between about 4 and about 6 mol percent of combined hexafluoropropene are valuable resinous thermoplastic materials having slightly rubbery characteristics.

The copolymers of the present invention are prepared by employing an initial monomer charge or feed stock containing between about 5 and about 20 mol percent of hexafluoropropene (or omega-hydroperfluoropropene), the remaining major constituent of the monomer charge being vinylidene fluoride. An initial monomer charge containing between about 5 and about 10 mol percent of hexafluoropropene, or less than about 20 weight percent of hexafluoropropene based on the combined total weight of hexafluoropropene and vinylidene fluoride in the monomer charge, leads to the production of resinous thermoplastic materials having between about 1 and about 6 mol percent of combined hexafluoropropene, some of which, as above indicated, have slightly rubbery characteristics. When an initial monomer charge containing between about 10 and about 20 mol percent of hexafluoropropene, or between about 20 and 30 weight percent of hexafluoropropene, is employed, the harder and less snappy thermoplastic resins with unusually high tensile properties and reversible elongation are obtained, that is, those containing between about 6 and about 15 mol percent of combined hexafluoropropene, the remaining major constituent being vinylidene fluoride.

It is within the scope of the present invention to include in the monomer charge of hexafluoropropene and vinylidene fluoride, a minor proportion, usually less than about 15 mol percent, of a third monomer which is preferably a polymerizable ethylenically-unsaturated halogen-substituted organic compound such as fluoro-1,3-dienes (e.g. 1,1,3-trifluorobutadiene) and halogen-substituted vinyl and allyl alkyl ethers (e.g. 1,1,2,2-tetrafluoroethyl vinyl ether and 2,2,2-trifluoroethyl allyl ether) to produce useful terpolymers. The presence of a third monomer improves the low temperature flexibility of the polymer without significantly sacrificing any of the desirable properties of the hexafluoropropene-vinylidene fluoride polymers of the present invention.

As indicated above, the copolymerization reaction between hexafluoropropene and vinylidene fluoride is carried out in the presence of a polymerization promoter which may be a free radical-forming or an ionic-type promoter. The free radical-forming promoters or initiators comprise the organic and inorganic peroxy and azo compounds. The ionic initiators comprise inorganic halides of the Friedel-Crafts catalyst type, and mineral acids. The initiator is genreally employed in an amount between about 0.001 and about five parts by weight per 100 parts of total monomers employed, and preferably are employed in an amount of between about 0.01 and about 1.0 part by weight.

The polymerization catalyst system may be aqueous or non-aqueous. Of the aqueous systems the emulsion polymerization systems are preferred since such systems lead to good yields of high molecular weight copolymers of hexafluoropropene and vinylidene fluoride having the desirable properties herein described. Activators, accelerators and buffers also may be included as ingredients of the aqueous systems, as desired.

The different types of aqueous emulsion systems may be conveniently differentiated on the basis of the promoter employed to initiate the copolymerization reaction. For example, one type of aqueous emulsion system is that in which an organic peroxide, which is preferably a water-soluble peroxide, is employed as the initiator and a second type is that in which an inorganic peroxy compound is empolyed as the initiator. Exemplary of the organic peroxides or oxidants which are particularly preferred as the initiators in an aqueous emulsion system are cumene hydroperoxide, diisopropyl benzene hydroperoxide, triisopropyl benzene hydroperoxide, tertiary-butyl hydroperoxide, tertiary-butyl perbenzoate and methyl cyclohexane hydroperoxide.

A second type of suitable aqueous emulsion polymerization system is that in which the promoter or initiator is one of the group of water-soluble inorganic peroxides such as the perborates, persulfates, perphosphates, percarbonates, barium peroxide, zinc peroxide and hydrogen peroxide. Particularly effective inorganic peroxides are the water-soluble salts of the peracids such as the sodium, potassium, calcium, barium and ammonium salts of the persulfuric and perphosphoric acids such as potassium persulfate and sodium perphosphate.

The emulsifier which is employed in the aqueous emulsion systems comprise the inorganic derivatives derived from aliphatic carboxylic acids including both the unsubstituted hydrocarbon and halogen-substituted aliphatic carboxylic acids. The non-halogenated hydrocarbon type of emulsifiers or soaps comprise the metal salt derivatives such as the potassium and sodium salts derived from hydrocarbon aliphatic acids having an optimum chain length between about 14 and about 20 carbon atoms per molecule and are typically exemplified by potassium stearate, sodium oleate and potassium palmitate, and any mixture thereof.

The preferred emulsifiers are the halogen-substituted carboxylic acids which are at least half fluorinated and which have between about 4 and about 20 carbon atoms per molecule. The particularly preferred halogen-substituted emulsifiers are the perfluorochloroalkanoic acids having at least 2 fluorine atoms for every chlorine atom and the perfluoroalkanoic acids, said halogen-substituted emulsifiers having between about 6 and about 14 carbon atoms per molecule. These preferred emulsifiers are produced by a variety of procedures. One procedure involves the potassium permanganate oxidation of a perhalogenated olefin which is at least half fluorinated and which is the product of thermal cracking of high molecular weight homopolymers or copolymers of perfluoro and/or perfluorochloroolefins. This oxidation is generally carried out in a basic medium at a temperature which is preferably a sub-zero temperature such as $-10°$ C.

A second procedure involves treating with fuming sulfuric acid, the telomer product obtained by telomerizing an olefin which is at least half fluorinated such as trifluorochloroethylene, in the presence of a bromohalomethane or a sulfuryl halide as the telogen. Such telomer products are prepared by reacting the olefin and telogen in the presence of a promoter such as benzoyl peroxide at a temperature between about $75°$ C. and about $210°$ C. in the presence or absence of sulfur dioxide.

When trifluorochloroethylene is telomerized with a bromohalomethane such as bromotrichloromethane, or with a sulfuryl halide such as sulfuryl chloride, the telomeric products are represented by the following general formulae, respectively:

(1) $\qquad M(CF_2CFCl)_n—Br$ (2) $\qquad Y_1(CF_2CFCl)_n—Y_2$ wherein M is a perhalomethyl radical having a total atomic weight not higher than 146.5, $n$ is an integer from 2 to 10, $Y_1$ is a halogen selected from the group consisting of fluorine, chlorine and bromine, and $Y_2$ is a halogen selected from the group consisting of chlorine and bromine. The hydrolysis of these telomers in fuming sulfuric acid at a temperature between about $140°$ C. and about $210°$ C. leads to the production of organic perfluorochlorocarboxylic acids having the recurring $—CF_2—CFCl—$ unit or at least 2 fluorine atoms for every chlorine atom. These acids react readily with alkali metal, alkaline earth metal and other metal hydroxides, carbonates and other such basic compounds to produce the corresponding metal salt derivatives.

Typical examples of the preferred emulsifiers employed in accordance with the present invention are the potassium and sodium salts of perfluorohexanoic acid, perfluorooctanoic acid, 3,5,6-trichlorooctafluorohexanoic acid, and 3,5,7,8-tetrachloroundecafluorooctanoic acid. Other halogenated emulsifiers which may be used are the derivatives of the organic polyfluorocarboxylic acids disclosed in U.S. Patent No. 2,559,752 as being efficacious dispersing agents in polymerization reactions.

The emulsifier is generally employed in a quantity between about 0.2 and about 10.0 parts by weight per 100 parts of total monomers charged, and preferably between about 0.5 and 5.0 parts by weight are used.

Activators which are often used in conjunction with the peroxy compound comprise sodium bisulfite, sodium metabisulfite, sodium thiosulfate, sodium hydrosulfate, a reducing sugar such as dextrose and levulose, and in general, any water-soluble reducing agent. Such activators are generally employed in an amount between about 0.2 and about 0.8 part by weight per 100 parts of total monomer employed.

Accelerators which may be employed in the aqueous polymerization systems comprise water-soluble variable valence metal salts of sulfates, nitrates, phosphates, and chlorides such as cuprous sulfate, ferrous sulfate and silver nitrate. Such compounds are generally employed in an amount between about 0.01 and about 1.0 part per 100 parts of total monomer employed, and preferably in an amount between about 0.05 and 0.5 part by weight. When an activator such as sodium metabisulfite, and an accelerator such as ferrous sulfate, are employed, the catalyst system is referred to as a "redox" system. The above-mentioned organic peroxides are preferably employed in such a redox system.

Although the pH of the polymerization system may be between about 2 and about 10, it has been found that best results are obtained in an aqueous system when the hexafluoropropene and vinylidene fluoride are copolymerized at a pH between about 4 and about 8. Appropriate pH conditions are maintained by the addition of a buffer as an ingredient of the polymerization catalyst system. Such buffers comprise disodium hydrogen phosphate and sodium metaborate. When the emulsifier is charged to the polymerization zone as a free acid such as perfluorooctanoic acid, it is best to employ a buffer such as disodium hydrogen phosphate and to maintain the pH of the system within the preferred range, that is, between about 4 and about 8.

As indicated above, the polymerization process of the present invention also may be carried in a non-aqueous mass or bulk polymerization system comprising a free radical-forming promoter such as the organic peroxy compounds and azo compounds, or an ionic promoter. The organic peroxides which may be used include the aliphatic and aromatic peroxy compounds as well as the fluorine and chlorine-substituted organic peroxides. Exemplary of suitable aliphatic peroxides are diacetyl peroxide, lauroyl peroxide, tertiarybutyl peroxide, caprylyl peroxide, trichloroacetyl peroxide, perfluoropropionyl peroxide, 3-carboxy propionyl peroxide, 3,4-dibromobutyryl peroxide, trifluoroacetyl peroxide, difluoroacetyl peroxide and perfluorononanoyl peroxide. Exemplary of the suitable aromatic peroxides are benzoyl peroxide, p-nitrobenzoyl peroxide and 2,4-dichlorobenzoyl peroxide. Exemplary of the azo compounds which may be employed are alpha, alpha-azo-isobutyronitrile, alpha,alpha-azo - methylnitrile and alpha,alpha-azo-ethylnitrile. Exemplary of suitable ionic initiators which may be employed in the mass type polymerization system are Friedel-Crafts type catalysts such as boron trifluoride, aluminum trichloride, stannic chloride, ferric chloride, titanium tetrachloride and phosphorus pentachloride; and mineral acids such as sulfuric acid and phosphoric acid.

The polymerization process of the present invention may also be effected in the presence of an organic solvent instead of or in addition to water. Examples of solvents of this kind are hydrocarbon solvents such as hexane, isooctane, and cyclohexane; aromatic solvents such as benzene and toluene; oxygenated solvents such as methanol, tertiary-butanol, dioxane and tetrahydrofuran; and preferably fluorochlorocarbon solvents such as fluorotrichloromethane (Freon-11).

As indicated previously, the copolymerization process of the present invention is generally conducted at a temperature between about 0° C. and 100° C. Particularly goods results are obtained when the temperature of copolymerization is maintained between about 25° C. and about 75° C. especially when the above-described preferred aqueous emulsion polymerization catalyst system is employed.

The copolymerization of hexafluoropropene and vinylidene fluoride is conveniently conducted under autogenous pressure which generally corresponds approximately to the pressure exerted by the vinylidene fluoride comonomer, and, in general, this pressure does not exceed about 160 atmospheres. Constant pressures may also be used, particularly if the reaction is conducted in a continuous manner, as discussed below. The copolymerization of hexafluoropropene and vinylidene fluoride also may be effected under super imposed pressure up to about 1,000 atmospheres or higher, if desired. These extreme pressures are obtained by the use of special high pressure equipment if necessary, and an inert gas such as nitrogen to obtain the desired elevated pressure. The presently described copolymerization process is effected over a relatively wide range of reaction time such as between about 2 and about 100 hours, but, in general, best yields and results are obtained between about 6 and 72 hours.

The polymerization reaction can be carried out in a batch-wise or continuous manner as desired. In conducting the polymerization in a continuous manner a mixture of the monomers is passed continuously through a zone which is maintained at reaction conditions and which can be provided with stirrers or other means of agitation. Alternatively, the catalyst can be injected into the system which is passing through the reaction zone.

Plasticizers and finely divided solids which serve as filters can be included in the polymerization mixture and the polymerization can be carried out in their presence. Examples of suitable fillers include pigments such as titanium oxide, metals such as copper and iron powder and other finely divided materials such as mica and asbestos. These and similar materials can also be added to the pre-formed polymers. It is also within the scope of the present invention to admix the copolymers of the present invention with a thermoplastic material such as high molecular weight polytrifluorochloroethylene homopolymer to obtain copolymers having improved impact strength.

The hexafluoropropene-vinylidene fluoride copolymers of the present invention are suitable and useful as durable, flexible coatings for application to metal or fabric surfaces. The copolymers are dissolved in a suitable solvent and applied to the surfaces by spraying, brushing, or other such conventional coating techniques. Particularly useful solvents for this purpose comprise the relatively low molecular weight and volatile aliphatic carboxylic acid esters such as methyl acetate, ethyl acetate and butyl acetate. It has been found that the copolymers of the present invention are only partially soluble in organic ketones such as acetone, methyl ethyl ketone and isobutyl ketone when treated with these solvents for four hours at 100° F. In this respect it should be noted that it is often desirable to reduce the molecular weight of the finished polymers of the present invention in order to obtain greater solubility in the more volatile organic solvents such as the ketones and to obtain increased softness in the rubbery characteristics which may sometimes be desirable. The polymerization reactions which are carried out in the presence of the polymerization promoters of the present invention normally tend to form very high molecular weight copolymer products of hexafluoropropene and vinylidene fluoride, that is polymers having a molecular weight of at least 50,000. A reduction of the strength of the recipe or polymerization promoter merely slows the rate of reaction without appreciably affecting the molecular weight of the finished copolymer. It has been found, however that the addition of various polymerization modifiers appreciably reduces the molecular weight of the copolymer products and increases their solubility without affecting unduly the over-all yield. Suitable polymerization modifiers include chloroform, 1,1,2-trichlorotrifluoroethane (Freon-113), carbon tetrachloride, bromotrichloromethane, trichloroacetyl chloride and dodecyl mercaptan. These polymerization modifiers are preferably added in amounts between about 1 and about 10 parts by weight per 100 parts of total hexafluoropropene and vinylidene fluoride charged to the polymerization zone.

The following examples are offered as a better understanding of the present invention and are not to be construed as unnecessarily limiting thereto. The Gehman stiffness values given in the following examples were determined according to ASTM Designation D–1053–49T.

EXAMPLE 1

After flushing a 300 ml. aminco polymerization bomb with nitrogen, the bomb was charged with the following aqueous emulsion polymerization catalyst system, freezing the contents of the bomb after the addition of each ingredient;

(1) 15 ml. of water containing 0.3 gram of dissolved sodium metabisulfite;
(2) 90 ml. of water containing 0.75 gram of dissolved potassium perfluorooctanoate, the pH having been adjusted to 12 by the addition of a 5 percent aqueous potassium hydroxide solution; and
(3) 45 ml. of water containng 0.75 gram of dissolved potassium persulfate.

In a separate experiment, the final pH of this polymerization catalyst system was found to be about 7. The bomb was then connected to a gas transfer system and evacuated at liquid nitrogen temperature. The bomb was then charged with 12.4 grams of hexafluoropropene and 47.6 grams of vinylidene fluoride to make up a total monomer charge containing 10 mol percent of hexafluoropropene and 90 mol percent of vinylidene fluoride. The polymerization bomb was then closed and placed in a mechanical shaker. The polymerization reaction was conducted for a period of 24 hours at a constant temperature of 50° C. under autogenous pressure with continuous shaking of the bomb. At the end of the 24 hours the bomb was vented to atmospheric pressure to remove the unreacted monomers. The polymer latex was coagulated by freezing it at liquid nitrogen temperature. The coagulated product was collected, washed thoroughly with hot water to remove residual salts and dried in vacuo at a temperature of 35° C. A white resinous thermoplastic was obtained which was very slightly rubbery, and was obtained in a 58 percent conversion. This product was analyzed and was found to contain 61.3 percent fluorine corresponding to 5 mol percent of combined hexafluoropropene and 95 mol percent of combined vinylidene fluoride. Upon analysis for carbon content, the product was shown to contain 35.48 percent carbon corresponding to 6 mol percent of combined hexafluoropropene and 94 mol percent of combined vinylidene fluoride. The weight percent of combined hexafluoropropene and vinylidene fluoride, based upon the carbon analysis, was found to be 13 and 87 weight percent, respectively. X-ray analysis of this product shows it to be highly crystalline.

This very slightly rubbery hexafluoropropene-vinylidene fluoride copolymer when milled in a rubber mill at 25° C. yielded a non-transparent plastic sheet. When pressed between chrome-plated ferrotype plates in an electrically-heated Carver press at 325° F. for a period of 5 minutes at 10,000 pounds per square inch, a clear, flexible plastic sheet was obtained.

The resistance of the resinous thermoplastic copolymer of this example to fuels and strong corrosive chemicals was excellent as evidenced by the fact that the copolymer exhibited a volume swell of only 1 percent after exposure at 25° C. to a fuel containing 30 percent by volume of toluene and 70 percent by volume of isooctane for 4 and 7 days, and only a 4 percent volume swell after exposure at 25° C. to red fuming nitric acid for 4 and 7 days.

The results of further preparation of copolymers of hexafluoropropene and vinylidene fluoride are set forth in Table I. The procedure followed included charging a feed cylinder with a monomer mixture of the proportions indicated in Table I. After flushing with nitrogen an autoclave was charged with 2700 grams water 13.5 grams $Cl(CF_2CFCl)_3CF_2COOH$, 13.5 grams $K_2S_2O_8$ and 28.8 grams $Na_2HPO_4$. The autoclave was pressured four times with nitrogen, vented, then pumped to a 20 inch mercury vacuum. Atfer heating to 64° with agitation the autoclave was pressured with the given monomer mixture to 125 p.s.i.g. and the feed regulator was set to continue demand feeding at this pressure throughout the reaction period. After the feed cylinder pressure dropped markedly, indicating that the liquid phase was exhausted, the polymerization was stopped and the polymeric latex was recovered. Polymer samples were obtained by freeze coagulation, followed by washing with hot water, dissolution in acetone and reprecipitation in water. Polymer properties are given in Table II.

*Table I*

| Run No. | Mole percent $CF_2CH_2$ in charge | $CF_2CH_2$ charged, g. | $CF_3CFCF_2$ charged, g. | Reaction conditions hr./at 64° C.[1] | Reaction pressure | Yield of product, g. | Intrinsic viscosity in acetone | Percent C | Wt. percent $CF_2CH_2$ | Mol percent $CF_2CH_2$ |
|---|---|---|---|---|---|---|---|---|---|---|
| 1 | 87 | 556 | 195 | 4.2 | 125 | 612 | .93 | 34.1 | 74.8 | 87.4 |
| 2 | 89 | 570 | 165 | 3.2 | 125 | 625 | .96 | 34.3 | 76.3 | 88.3 |
| 3 | 91 | 582 | 135 | 2.9 | 125 | 602 | .90 | 34.9 | 80.7 | 90.7 |
| 4 | 93 | 595 | 105 | 4.3 | 125 | 500 | .88 | 35.8 | 87.4 | 94.2 |
| 5 | 83 | 36 | [2] 184 | 2.6 | 125 | 360 | .86 | 34.2 | 70.8 | 87.3 |

[1] Water—100, $Cl(CF_2CFCl)_3CF_2COOH$—0.5, $K_2S_2O_8$—0.5, $Na_2HPO_4$—1.06, Monomers 25–50.
[2] $HCF_2CF_2CFCF_2$ was the comonomer.

Table II

| Run No. | Mole Percent charged | CF₂CH₂, found [1] | Comonomer | Intrinsic viscosity in acetone | Unoriented film | | |
|---|---|---|---|---|---|---|---|
| | | | | | Tensile, p.s.i. | Modulus,[2] p.s.i. | Elongation,[3] p.s.i. |
| 1 | 87 | 87.4 | CF₃CFCF₂ | .93 | 4,140 | 4,060 | 710 |
| 2 | 89 | 88.3 | CF₃CFCF₂ | .96 | 4,160 | 5,080 | 530 |
| 3 | 91 | 90.7 | CF₃CFCF₂ | .90 | 5,350 | 9,790 | 550 |
| 4 | 93 | 94.2 | CF₃CFCF₂ | .88 | 6,150 | 24,100 | 530 |
| 5 | 83 | 87.3 | HCF₂CF₂CFCF₂ | .86 | 1,410 | 5,260 | 510 |

[1] Based on percent carbon analysis.
[2] Modulus calculated at extension rate of 0.2 in./min.
[3] Elongation based on extension rate of 2 in./min.

To illustrate the outstanding tensile and reversible elongation properties of the partially crystalline elastomers having between about 6 and about 15, particularly between about 6 and about 14, mol percent of hexafluoropropene, the product of tensile strength and reversible elongation is reported in FIGURE 1 for various hexafluoropropene mol ratios, this data being obtained by utilizing the same polymerization techniques as in Examples 2–6. Although the tensile strength increased and the reversible elongation decreased with increasing amounts of hexafluoropropene in the copolymer, those copolymers having between 6 and about 14 mol percent of hexafluoropropene show both increased tensile values and also unexpectedly good reversible elongation. Moreover, the tensile-reversible elongation product of those copolymers having between about 1 and about 14 mol percent hexafluoropropene is actually comparable to or higher than the highly crystalline vinylidene fluoride homopolymer. Above about 94 mol percent vinylidene fluoride (i.e. less than 6 mol percent hexafluoropropene) the copolymer is essentially crystalline in nature and the reversible elongation decreases rapidly.

Measurement of tensile strength and reversible elongation were made on 40 mil thick specimens pressed at 350–400° F. and quickly cooled to room temperature. Elongation was measured on the sample by pulling at an extension rate of 2 inches per minute until the sample broke. The length of the broken sample at break and after retraction was observed, and the reversible elongation of the sample was calculated from the data obtained.

As previously stated, the copolymers of the present invention prepared by copolymerization of omega-hydroperfluoropropene or hexafluoropropene and vinylidene fluoride under the polymerization conditions previously discussed possess unique and highly desirable physical, mechanical, and chemical properties. They have high tensile strength and good reversible elongation and are remarkably resistant to embrittlement, degradation and discoloration at temperatures between about −30° F. and about 600° F. and higher. They are equally remarkably resistant to swell by aromatic and aliphatic oils and fuels, and ester-type hydraulic fuels such as relatively high molecular weight alkyl esters of organic dicarboxylic acids having typical oily characteristics. In addition they are resistant to swell and chemical break-down when exposed to strong powerful corrosive agents such as red fuming nitric acid and ozone. In addition, they do not swell when exposed to carbon bisulfide, carbon tetrachloride, 2,5-dichlorobenzotrifluoride, diethyl ether and are stable to attack by sunlight, fungi and micro-organisms in general.

The hexafluoropropene-vinylidene copolymers of the present invention are particularly suited as durable, flexible coatings to various fabric, metallic, and other rigid surfaces. They are especially valuable as insulating materials for motor parts, wires and the like. The resinous copolymers, that is those containing between about 1 and about 6 mol percent of hexafluoropropene, are used in a preferred form as coatings or laminates for metal surfaces employed in the manufacture of aircraft component parts such as aluminum surfaces of tanks and other component parts exposed to strong reagents. They also may take the form of protective envelopes and other articles of manufacture which are comprised of exposed surfaces which may be exposed to abrasion or other forms of impact in the course of forming their function under special environmental conditions.

The partially crystalline, high tensile strength copolymers containing between about 6 and about 15, particularly between about 6 and about 14, mol percent of hexafluoropropene (or omega-hydroperfluoropropene) are extremely useful because of their unique combination of high tensile strength and reversible elongation properties and are especially suitable as durable, flexible coatings for application to various fabric surfaces. These surfaces may, in a preferred form of application, take the form of protective clothing (for example, as suits, boots, gloves, helmets and other wearing apparel) and other articles of manufacture which are comprised of exposed surfaces which may be subjected to bending, folding, or other forms of distortion in the course of performing their function under special environmental conditions. They may also be used in film form (either oriented or unoriented) e.g. in electrical tapes, magnetic recording tapes, etc., and as protective coatings on tanks, storage vessels and the like.

The hexafluoropropene-vinylidene fluoride copolymers of the present invention are moldable into various articles of manufacture by compression molding at temperatures between about 250° and about 400° F., and at a pressure of 1500 to 3000 pounds per square inch in about 5 to 20 minutes. These copolymers may also be extrusion-molded at about 300° F. and also may be molded by conventional transfer molding techniques.

As is apparent, the present invention relates to valuable novel crystalline thermoplastic and partially crystalline thermoplastic polymers comprising hexafluoropropene and vinylidene fluoride, and to a method of preparation of such polymers in various comonomer ratios.

Various alterations and modifications of the polymerization system employed and reaction conditions may become apparent to those skilled in the art without departing from the scope of this invention.

I claim:

1. A novel thermoplastic and at least partially crystalline copolymer consisting essentially of between 87 and 99 mol percent vinylidene fluoride and between 1 and 13 mol percent of a member selected from the group consisting of hexafluoropropene and omega-hydroperfluoropropene, the product of the tensile strength (p.s.i.g.) and percent reversible elongation of said copolymer being at least 1,000,000.

2. A novel resinous crystalline thermoplastic copolymer consisting essentially of from 1 to 6 mol percent of hexafluoropropene and from 94 to 99 mol percent of vinylidene fluoride, the product of the tensile strength (p.s.i.g.) and percent reversible elongation of said copolymer being at least 1,000,000.

3. The novel resinous crystalline thermoplastic copolymer of claim 2 having about 5 mol percent hexafluoropropene.

4. A novel thermoplastic and partially crystalline copolymer consisting essentially of from 6 to 13 mol percent hexafluoropropene and from 87 to 94 mol percent vinylidene fluoride, the product of the tensile strength (p.s.i.g.) and percent reversible elongation being at least 1,000,000.

5. A novel thermoplastic and partially crystalline copolymer consisting essentially of from 6 to 13 mol percent omega-hydroperfluoropropene and from 87 to 94 mol percent vinylidene fluoride, the product of the tensile strength (p.s.i.g.) and percent reversible elongation being at least 1,000,000.

References Cited by the Examiner

UNITED STATES PATENTS 2,435,537  2/48  Ford et al. _____ 260—92.1
3,051,677  4/57  Rexford _____ 260—87.7

WILLIAM H. SHORT, *Primary Examiner.*

H. N. BURSTEIN, J. R. LIBERMAN, *Examiners.*